(12) United States Patent
Chen et al.

(10) Patent No.: US 9,573,467 B2
(45) Date of Patent: Feb. 21, 2017

(54) VEHICLE AND SEMI-AUTOMATIC FOOT-PEDAL DEVICE THEREOF

(71) Applicant: WINBO DONGJIAN AUTO ACCESSORIES MANUFACTURING CO., LTD, Foshan (CN)

(72) Inventors: Yongbo Chen, Foshan (CN); Jie Yang, Foshan (CN); Wei Huang, Foshan (CN); Ming Zhong, Foshan (CN); Wei Hu, Foshan (CN); Yufang Xu, Foshan (CN)

(73) Assignee: WINBO DONGJIAN AUTO ACCESSORIES MANUFACTURING CO., LTD., Foshan, Guangdong Province (CN)

( * ) Notice: Subject to any disclaimer, the term of this patent is extended or adjusted under 35 U.S.C. 154(b) by 14 days.

(21) Appl. No.: 14/574,368

(22) Filed: Dec. 17, 2014

(65) Prior Publication Data
US 2016/0089975 A1    Mar. 31, 2016

(30) Foreign Application Priority Data
Sep. 26, 2014    (CN) .......................... 2014 1 0505661

(51) Int. Cl.
*G05G 1/30*    (2008.04)
*B60R 3/02*    (2006.01)
*B60K 26/02*    (2006.01)

(52) U.S. Cl.
CPC ................. *B60K 26/02* (2013.01); *B60R 3/02* (2013.01); *G05G 1/30* (2013.01)

(58) Field of Classification Search
CPC . B60K 26/02; B60K 26/021; B60K 2023/005; B60T 7/04; B60T 7/06; G05G 1/30; G05G 1/44; Y10T 74/20528; B60R 3/02; B60R 21/09
See application file for complete search history.

(56) References Cited

U.S. PATENT DOCUMENTS

| | | | |
|---|---|---|---|
| 6,641,158 B2* | 11/2003 | Leitner | B60R 3/02 105/443 |
| 7,584,683 B2* | 9/2009 | Fujiwara | B60T 7/06 74/516 |
| 7,637,519 B2* | 12/2009 | Leitner | B60R 3/02 280/163 |

(Continued)

*Primary Examiner* — Adam D Rogers
(74) *Attorney, Agent, or Firm* — Cheng-Ju Chiang (57) ABSTRACT

A semi-automatic foot-pedal device is provided, which comprises a panel and a pedal-connecting component connected with the panel. The pedal-connecting component comprises an upper bracket, a left bracket, a lower bracket, a right bracket and an elastic unit; when the pedal-connecting component is in a closed state, the panel moves away from the upper bracket to transform the pedal-connecting component into an elastically spread state under a force on the panel in a downward direction; when the pedal-connecting component is in a spread state, the panel moves towards the upper bracket to transform the pedal-connecting component into an elastically closed state under a force on the panel in an obliquely-upward direction. The semi-automatic foot-pedal device of the present disclosure has a novel structure, and does not need a conventional motor system, so it saves the electric power and is safer to use.

20 Claims, 6 Drawing Sheets

(56) References Cited

U.S. PATENT DOCUMENTS

| | | | | |
|---|---|---|---|---|
| 8,360,455 | B2* | 1/2013 | Leitner | B60R 3/02 |
| | | | | 280/163 |
| 2009/0008894 | A1 | 1/2009 | Kuntze et al. | |
| 2012/0031220 | A1* | 2/2012 | Seki | B60R 21/09 |
| | | | | 74/512 |
| 2013/0180356 | A1* | 7/2013 | Burguera Albizuri | G05G 1/44 |
| | | | | 74/560 |
| 2015/0107402 | A1* | 4/2015 | Leem | G05G 5/03 |
| | | | | 74/512 |
| 2015/0153760 | A1* | 6/2015 | Kim | G05G 1/44 |
| | | | | 74/512 |
| 2015/0232072 | A1* | 8/2015 | Periasamy | B60T 7/06 |
| | | | | 74/512 |
| 2016/0031422 | A1* | 2/2016 | Gotoh | B60T 7/06 |
| | | | | 60/594 |

* cited by examiner

VEHICLE AND SEMI-AUTOMATIC FOOT-PEDAL DEVICE THEREOF

FIELD OF THE INVENTION

The present disclosure relates to the field of automobiles, and more particularly, to a semi-automatic foot-pedal device and a vehicle equipped with the semi-automatic foot-pedal device.

BACKGROUND OF THE INVENTION

For some automobiles that have a high chassis, electric pedals are typically mounted on the frames thereof to make it convenient to get on and off the automobiles. When people are to get on or off such an automobile, the electric pedal will extend out automatically to make it easier and safer to get on and off with the help of the pedal. The conventional pedals are generally electric pedals, each of which comprises a pedal body, a pedal bracket, a passive arm, an active arm and a motor. The passive arm and the active arm are hinged to the pedal body and the pedal bracket respectively, an output shaft of the motor is connected with the active arm, and the active arm is driven by the motor to enable the pedal body to extend out or retract. When the motor fails due to such factors as the rain, the pedal may become incapable of extending out or retracting and this will affect the normal use of the pedal.

To solve the aforesaid problem, a stationary pedal has been proposed in the prior art, which comprises a panel and a pedal bracket connected with the panel. However, the stationary pedal is spread at any time regardless of whether it is used and the height of the panel relative to the ground can not be adjusted, which makes it inconvenient to use the pedal. Specifically, if the pedal bracket is too long, it may often happen that the pedals of the automobiles that have a low chassis collide with the uneven ground; and if the pedal bracket is too short, then the height of the panel relative to the ground is too high and it is inconvenient for those who are short to use the panel.

SUMMARY OF THE INVENTION

The present disclosure provides a vehicle and a semi-automatic foot-pedal device thereof, which are mainly intended to solve the following technical problem of the prior art: the motor of an electric pedal may fail due to such factors as the rain to make the pedal incapable of extending out or retracting; or for the stationary pedal, it is in a spread state at any time regardless of whether it is used, and the height of the panel relative to the ground can not be adjusted, which makes it inconvenient to use the pedal.

To solve the aforesaid technical problem, a technical solution adopted by the present disclosure is to provide a semi-automatic foot-pedal device, which comprises a panel and a pedal-connecting component connected with the panel. The pedal-connecting component comprises an upper bracket, a left bracket, a lower bracket, a right bracket and an elastic unit, the left bracket is hinged to the upper bracket; one end of the lower bracket is hinged to the left bracket and the other end is connected with the panel; one end of the right bracket is hinged to the upper bracket, and the other end is hinged to the lower bracket; one end of the elastic unit is hinged to the upper bracket, and the other end is hinged to the right bracket; when the pedal-connecting component is in a closed state, the panel moves away from the upper bracket to transform the pedal-connecting component into an elastically spread state under a force on the panel in a downward direction; when the pedal-connecting component is in a spread state, the panel moves towards the upper bracket to transform the pedal-connecting component into an elastically closed state under a force on the panel in an obliquely-upward direction.

Preferably, the pedal-connecting component further comprises a first hinge shaft, a second hinge shaft, a third hinge shaft, a fourth hinge shaft, a fifth hinge shaft and a sixth hinge shaft, the first hinge shaft is adapted to hinge the left bracket to the upper bracket; the second hinge shaft is adapted to hinge the lower bracket to the left bracket; the third hinge shaft is adapted to hinge the right bracket to the upper bracket; the fourth hinge shaft is adapted to hinge the right bracket to the lower bracket; the fifth hinge shaft is adapted to hinge the elastic unit to the upper bracket; and the sixth hinge shaft is adapted to hinge the elastic unit to the right bracket.

Preferably, the upper bracket comprises a first plate block, a second plate block, a third plate block and a position-limiting plate, the first plate block is formed with a plurality of mounting screw holes; the second plate block and the third plate block are disposed in parallel with and spaced apart from each other at two sides of the first plate block respectively; and the position-limiting plate is connected with the first plate block.

Preferably, the left bracket comprises a left connecting plate, a first left arm, a second left arm, a reinforcing plate and a first position-limiting base, the first left arm and the second left arm are disposed in parallel with and spaced apart from each other at two sides of the left connecting plate respectively; the reinforcing plate is disposed between the first left arm and the second left arm; and the first position-limiting base is disposed on the reinforcing plate.

Preferably, the pedal-connecting component further comprises a first elastic block, which is disposed inside the first position-limiting base, and is adapted to abut against the position-limiting plate when the pedal-connecting component is closed.

Preferably, the right bracket comprises a right connecting plate, a first right arm, a second right arm, a bent piece and a second position-limiting base, the first right arm and the second right arm are disposed in parallel with and spaced apart from each other at two sides of the right connecting plate respectively; the bent piece is connected between the first right arm and the second right arm; and the second position-limiting base is disposed at the top of the bent piece.

Preferably, the elastic unit comprises a first hinge joint, a second hinge joint and a spring, the first hinge joint is hinged between the first plate block and the third plate block; the second hinge joint is hinged to the bent piece; and the spring is disposed between the first hinge joint and the second hinge joint.

Preferably, the lower bracket comprises a first arcuate plate, a second arcuate plate and a third arcuate plate, the second arcuate plate and the third arcuate plate are disposed in parallel with and spaced apart from each other at two sides of the first arcuate plate respectively.

Preferably, the pedal-connecting component further comprises a second elastic block, the second elastic block is disposed inside the second position-limiting base, and is adapted to abut against the first arcuate plate when the panel is spread.

To solve the aforesaid problem, another technical solution adopted by the present disclosure is to provide a vehicle, which comprises the aforesaid semi-automatic foot-pedal device.

The present disclosure has the following benefits: as compared to the prior art, the vehicle and the semi-automatic foot-pedal device of the present disclosure connect the upper bracket and the right bracket with an elastic unit therebetween so that the semi-automatic foot-pedal device can be elastically spread or closed under an external force; and the present disclosure has a simple structure and does not need a conventional motor system, so it saves the electric energy and is safer to use.

DETAILED DESCRIPTION OF THE INVENTION

Herein below, the technical solutions of embodiments of the present disclosure will be described clearly and completely with reference to the attached drawings illustrating the embodiments of the present disclosure. Obviously, the embodiments described herein are only some of the embodiments of the present disclosure but do not represent all embodiments of the disclosure. All other embodiments that can be devised by those of ordinary skill in the art on the basis of the embodiments described herein and without making inventive efforts shall fall within the scope of the present disclosure.

Figure 1:
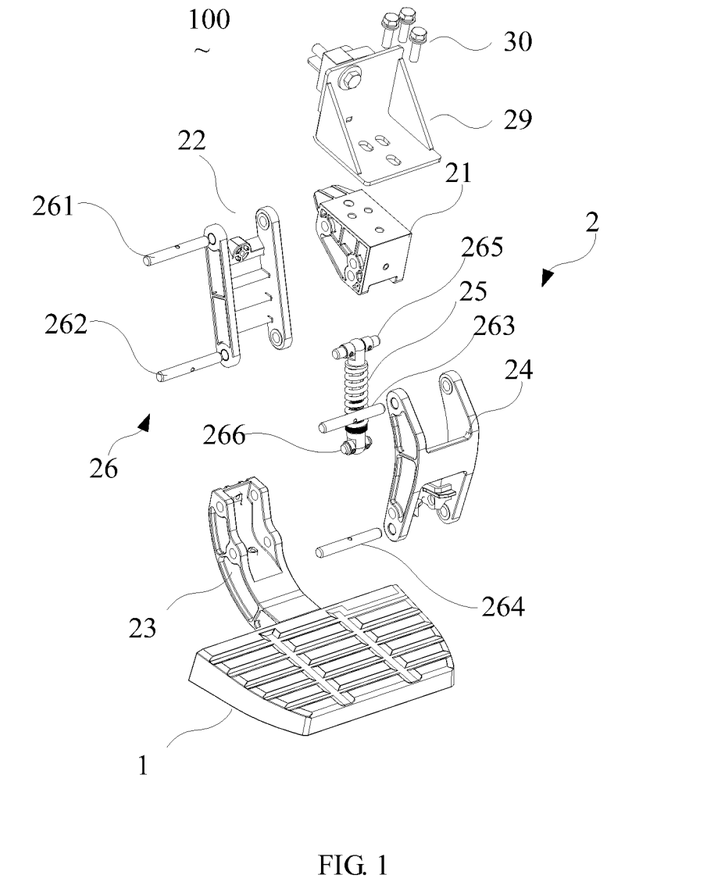
FIG. 1 is an exploded view of a semi-automatic foot-pedal device of the present disclosure.
Figure 2:
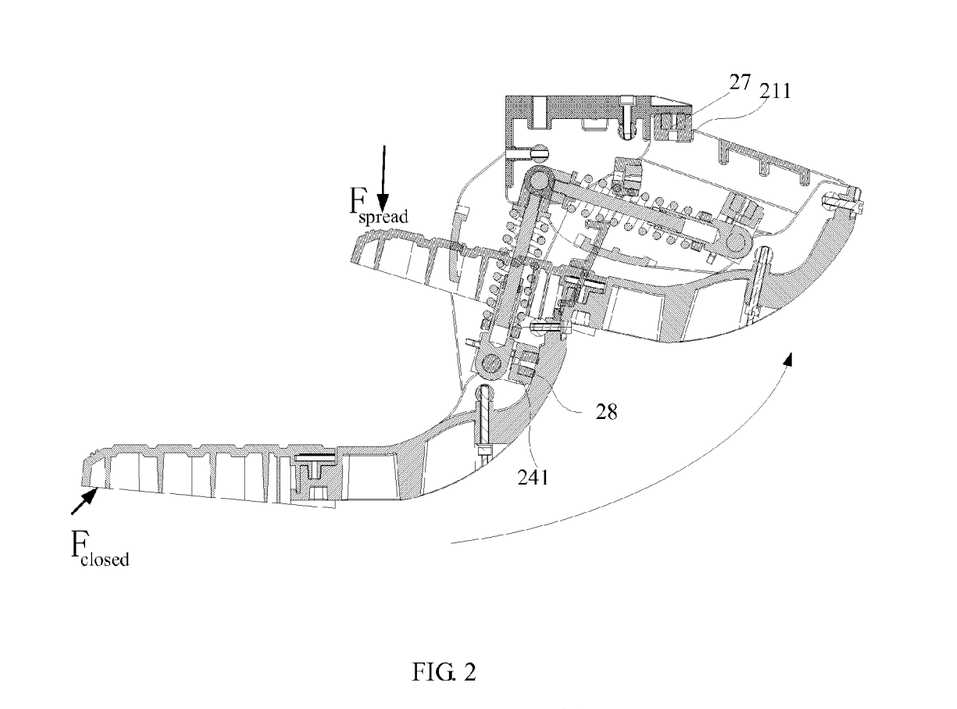
FIG. 2 is a cross-sectional view illustrating a process of transforming the semi-automatic foot-pedal device from a spread state into a closed state according to the present disclosure.

Referring to FIG. 1 and FIG. 2 together, FIG. 1 is an exploded view of a semi-automatic foot-pedal device of the present disclosure, and FIG. 2 is a cross-sectional view illustrating a process of transforming the semi-automatic foot-pedal device from a spread state into a closed state according to the present disclosure. A semi-automatic foot-pedal device 100 of the present disclosure mainly comprises a panel 1 and a pedal-connecting component 2 connected with the panel 1.

The pedal-connecting component 2 mainly comprises an upper bracket 21, a left bracket 22, a lower bracket 23, a right bracket 24 and an elastic unit 25. The left bracket 22 is hinged to the upper bracket 21, one end of the lower bracket 23 is hinged to the left bracket 22 and the other end is connected with the panel 1. One end of the right bracket 24 is hinged to the upper bracket 21, and the other end is hinged to the lower bracket 23. One end of the elastic unit 25 is hinged to the upper bracket 21, and the other end is hinged to the right bracket 24. All the aforesaid hinging can be achieved through use of hinge shafts 26. Each of the hinge shafts 26 may be a bolt that is used with a nut, or a connecting rod that has threads at two ends and used with nuts, or some other hinging means for fixation that are commonly used by those skilled in the art.

As shown in FIG. 2, the pedal-connecting component 2 has a closed state and a spread state. When the pedal-connecting component 2 is in the closed state, the panel 1 moves away from the upper bracket 21 to transform the pedal-connecting component 2 into an elastically spread state under a force on the panel 1 in a downward direction; and when the pedal-connecting component 2 is in the spread state, the panel 1 moves towards the upper bracket 21 to transform the pedal-connecting component 2 into an elastically closed state under a force on the panel 1 in an obliquely-upward direction.

The hinge shafts 26 specifically comprises: a first hinge shaft 261, being adapted to hinge the left bracket 22 to the upper bracket 21; a second hinge shaft 262, being adapted to hinge the lower bracket 23 to the left bracket 22; a third hinge shaft 263, being adapted to hinge the right bracket 24 to the upper bracket 21; a fourth hinge shaft 264, being adapted to hinge the right bracket 24 to the lower bracket 23; a fifth hinge shaft 265, being adapted to hinge the elastic unit 25 to the upper bracket 21; and a sixth hinge shaft 266, being adapted to hinge the elastic unit 25 to the right bracket 24. It should be appreciated that, the size of each of the hinge shafts 26 is selected according to the length of the hinge site and is not limited to the hinge shafts 26 of the same size.

In a preferred embodiment, the lower bracket 23 and the right bracket 24 may be arc-shaped so that the elastic unit 25 that is disposed to be hinged to the right bracket 24 can better abut against the lower bracket 23 to prolong the service life of the semi-automatic foot-pedal device 100.

Figure 3:
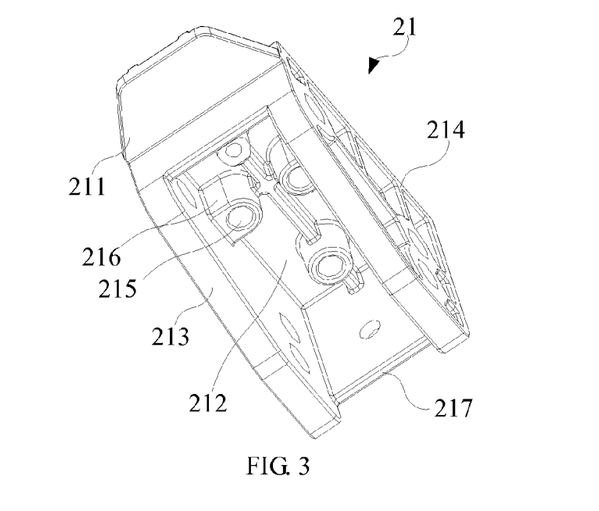
FIG. 3 is a perspective structural view of an upper bracket of the semi-automatic foot-pedal device shown in FIG. 1.
Figure 4:
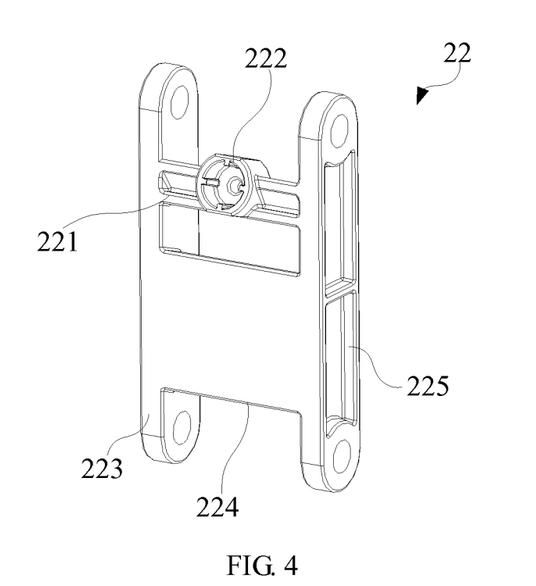
FIG. 4 is a perspective structural view of a left bracket of the semi-automatic foot-pedal device shown in FIG. 1.
Figure 5:
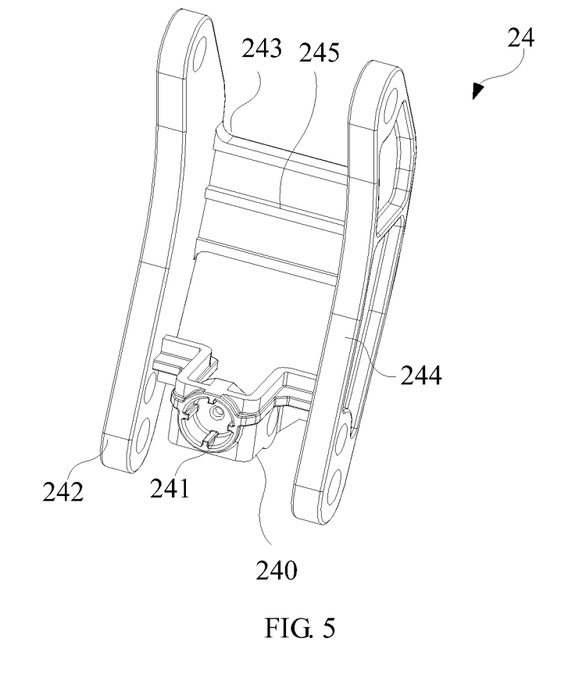
FIG. 5 is a perspective structural view of a right bracket of the semi-automatic foot-pedal device shown in FIG. 1.

Referring to FIGS. 3~5, FIG. 3 is a perspective structural view of an upper bracket of the semi-automatic foot-pedal device shown in FIG. 1, FIG. 4 is a perspective structural view of a left bracket of the semi-automatic foot-pedal device shown in FIG. 1, and FIG. 5 is a perspective structural view of a right bracket of the semi-automatic foot-pedal device shown in FIG. 1.

As shown in FIG. 3, the upper bracket 21 comprises a position-limiting plate 211, and a second plate block 213, a first plate block 212 and a third plate block 214 that are sequentially connected. Specifically, the first plate block 212 is provided with a plurality of convex columns 216 formed with a mounting screw hole 215 thereon. Through engagement of a screw with the mounting screw hole 215, the upper bracket 21 can be stably fixed onto other devices (such as a frame of an automobile). The second plate block 213 and the third plate block 214 are disposed in parallel with and spaced apart from each other at two sides of the first plate block 212 respectively. The position-limiting plate 211 is disposed at an end portion of the first plate block 212, and is adapted to limit the position of the left bracket 22 when the pedal-connecting component 2 is in a closed state. In order to make it more convenient to fix the upper bracket 21 onto other devices, the upper bracket 21 may further comprise a fourth plate block 217 that is formed with the screw hole or a through hole. Specifically, the fourth plate block 217 and the position-limiting plate 211 are disposed at two ends of the first plate block 212 respectively.

As shown in FIG. 4, the left bracket 22 comprises a reinforcing plate 221, a first position-limiting base 222, and a first left arm 233, a left connecting plate 224 and a second left arm 225 that are sequentially connected. Specifically, the first left arm 223 and the second left arm 225 are disposed in parallel with and spaced apart from each other at two sides of the left connecting plate 224 respectively, and the left connecting plate 224 may be integrally formed with the first left arm 223 and the second left arm 225, and may also be connected with the first left arm 223 and the second left arm 225 separately. The reinforcing plate 221 is disposed between the first left arm 223 and the second left arm 225, and the first position-limiting base 222 is disposed on the reinforcing plate 221. In order to further reinforce the strength of the left bracket 22, a plurality of reinforcing ribs may be disposed on the left connecting plate 224.

As shown in FIG. 2, the pedal-connecting component 2 further comprises a first elastic block 27. The first elastic block 27 is disposed inside the first position-limiting base 222, and one end portion of the first elastic block 27 protrudes out of the first position-limiting base 222 and is adapted to, when the pedal-connecting component 2 is in a closed, elastically abut against the position-limiting plate 211 for position-limiting purpose.

As shown in FIG. 5, the right bracket 24 comprises a bent piece 240, a second position-limiting base 241, and a first right arm 242, a right connecting plate 243 and a second right arm 244 that are sequentially connected. Specifically, the first right arm 242 and the second right arm 244 are disposed in parallel with and spaced apart from each other at two sides of the right connecting plate 243 respectively. The right connecting plate 243 may be integrally formed with the first right arm 242 and the second right arm 244, and may also be connected with the first right arm 242 and the second right arm 244 separately. The bent piece 240 is connected between the first right arm 242 and the second right arm 244, and the second position-limiting base 241 is disposed at the top of the bent piece 240.

Specifically, the bent piece 240 comprises an n-shaped piece, and a first connecting portion and a second connecting portion that are disposed at two ends of the n-shaped piece respectively, and the first connecting portion is connected with the first right arm 242; the second connecting portion is connected with the second right arm 244, and two sidewalls of the n-shaped piece are each formed with a hinge hole so that the lower end of the elastic unit 25 can be hinged to the right bracket 24 via the hinge shaft 266. The second position-limiting base 241 is disposed at the n-shaped top of the n-shaped piece, and in order to reinforce the strength of the right bracket 24, a plurality of reinforcing ribs 245 may be disposed on the right connecting plate 243.

Figure 6:
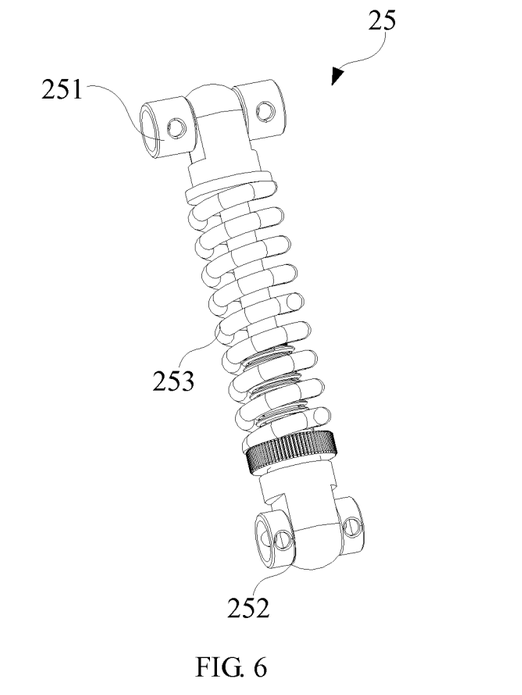
FIG. 6 is a perspective structural view of an elastic unit of the semi-automatic foot-pedal device shown in FIG. 1.
Figure 7:
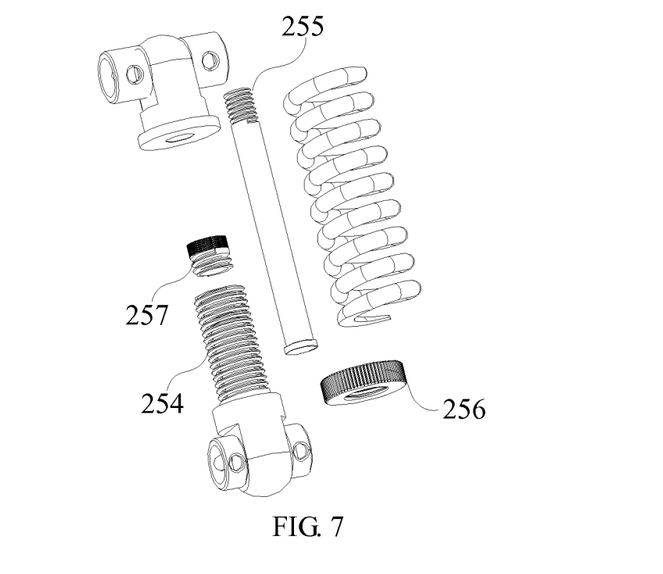
FIG. 7 is an exploded view of the elastic unit shown in FIG. 6.

Referring to FIG. 6 and FIG. 7 together, FIG. 6 is a perspective structural view of an elastic unit of the semi-automatic foot-pedal device shown in FIG. 1, and FIG. 7 is an exploded view of the elastic unit shown in FIG. 6.

As shown in FIG. 6, the elastic unit 25 mainly comprises a first hinge joint 251, a second hinge joint 252 and a spring 253. The first hinge joint 251 is disposed between the second plate block 213 and the third plate block 214 via the fifth hinge shaft 265, the second hinge joint 252 is hinged to the bent piece 240 via the fifth hinge shaft 266, and the spring 253 is disposed between the first hinge joint 251 and the second hinge joint 252.

The first hinge joint 251 may be connected with the second hinge joint 252 directly via the spring 253. In a preferred embodiment, the elastic unit 25 may further comprise a guiding tube 254, a guiding rod 255, a position-limiting collar 256 and a connecting sleeve 257. One end of the guiding rod 255 is fixedly connected with the first hinge joint 251, and the other end is inserted into the guiding tube 254 through the connecting sleeve 257. The guiding tube 254 is fixed to the second hinge joint 252 through the position-limiting collar 256. The spring 253 is fitted over the guiding rod 255, with one end of the spring 253 being fixed to the first hinge joint 251 and the other end being fitted over the guiding rod 255 so that the spring 253 can be guided to be compressed or spread, and this can prevent deformation of the spring 253 under a lateral pressure which would otherwise affect the elasticity of the spring 253.

Figure 8:
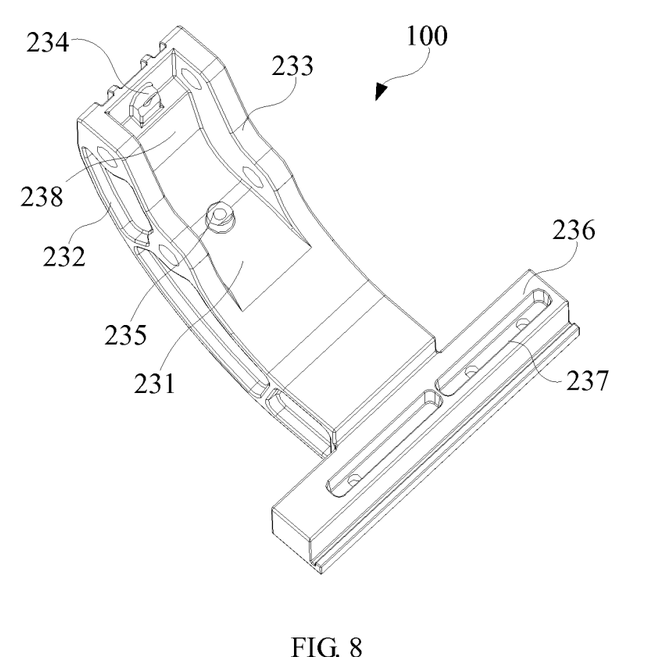
FIG. 8 is a perspective structural view of a lower bracket of the semi-automatic foot-pedal device shown in FIG. 1.

Referring also to FIG. 8, there is shown a perspective structural view of the lower bracket 23 of the semi-automatic foot-pedal device shown in FIG. 1. As shown in FIG. 8, the lower bracket 23 comprises a first arcuate plate 231, a second arcuate plate 232, a third arcuate plate 233, a first support base 234, a second support base 235, a connecting plate 236 and a position-limiting portion 238. The second arcuate plate 232 and the third arcuate plate 233 are disposed in parallel with and spaced apart from each other at two sides of the first arcuate plate 231 respectively. The first support base 234 and the second support base 235 are both formed with an arc-shaped notch to engage with the second hinge shaft 262 and the fourth hinge shaft 264 respectively. The first support base 234 and the position-limiting portion 238 are disposed at one end of the first arcuate plate 231, and the connecting plate 236 is disposed at the other end of the first arcuate plate 231 to connect with the panel 1. The connecting plate 236 may be formed with a plurality of connecting slots 237 for snap-fit to the panel 1. Furthermore, the panel 1 is formed with a plurality of bosses each having a through hole to engage with the connecting slots 237, and when the through holes of the connecting slots 237 engage with the through holes of the bosses, the panel 1 can be locked onto the connecting plate 236 by connecting pieces.

As shown in FIG. 2, the pedal-connecting component 2 of the present disclosure further comprises a second elastic block 28 disposed inside the second position-limiting base 241. One end portion of the second elastic portion 28 protrudes out of the second position-limiting base 241 and is adapted to elastically abut against the position-limiting portion 238 of the first arcuate plate 231 when the pedal-connecting component 2 is spread.

The first elastic block 27 and the second elastic block 28 of the present disclosure may be made of rubber, silicone or the like material.

Figure 9:
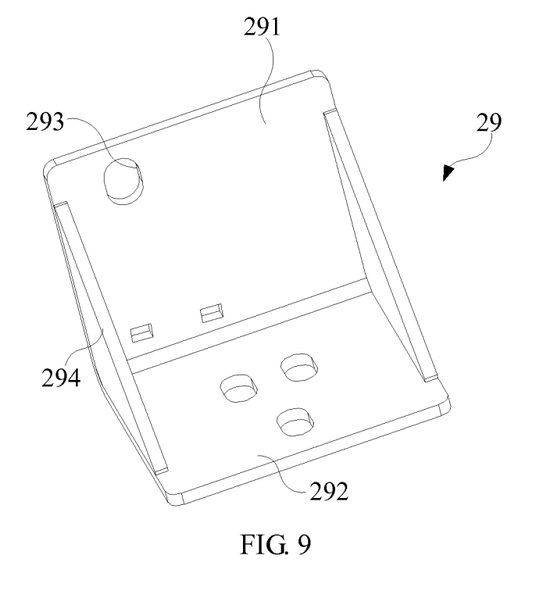
FIG. 9 is a perspective structural view of a connecting base of a vehicle of the present disclosure.

Referring also to FIG. 9, there is shown a perspective structural view of a connecting base of a vehicle of the present disclosure. The present disclosure further provides a vehicle, which comprises a connecting base 29 and the aforesaid semi-automatic foot-pedal device 100, and the semi-automatic foot-pedal device 100 is fixed to a certain position of the vehicle through the connecting base 29.

Specifically, as shown in FIG. 9, the connecting base 29 comprises an upper connecting plate 291, a lower connecting plate 292, and a plurality of mounting screw holes 293 formed on the upper connecting plate 291 or the lower connecting plate 292. The second plate block 213 is connected with the lower connecting plate 292 via a bolt. The upper connecting plate 291 may be fixed to a certain position of the vehicle via a screw 30 or be further fixed to the vehicle through a fixation plate. Of course, in order to make it convenient to fix the connecting piece 29 to the vehicle, two side edges of the lower connecting plate 292 may be further provided with a side plate 294 that has a mounting screw hole respectively.

Figure 10:
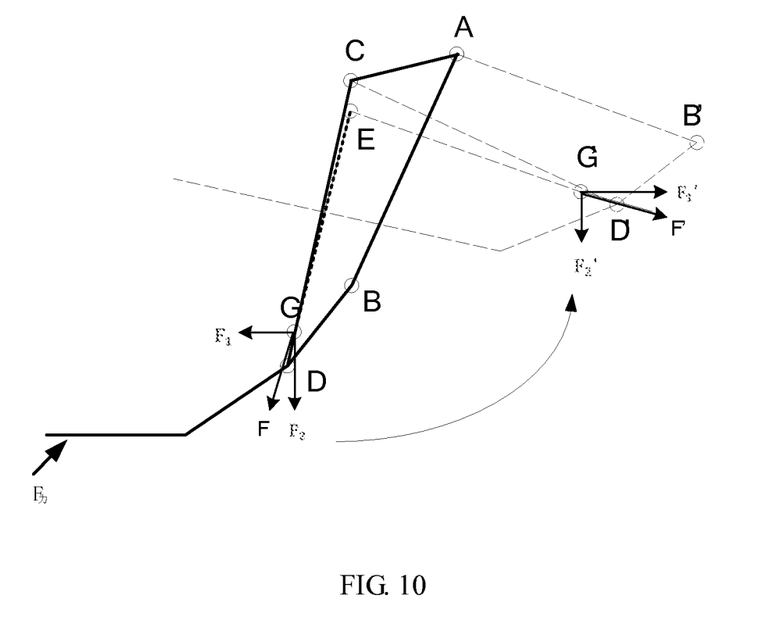
FIG. 10 is a schematic diagram illustrating force analysis of the semi-automatic foot-pedal device of the present disclosure.

FIG. 10 is a diagram illustrating force analysis in a process of transforming the semi-automatic foot-pedal device shown in FIG. 2 from a spread state into a closed state. As shown in FIG. 10, points A, B, C, D, E, and G therein represent the first hinge shaft 261, the second hinge shaft 262, the third hinge shaft 263, the fourth hinge shaft 264, the fifth hinge shaft 265 and the sixth hinge shaft 265 respectively, points CAE represent the upper bracket 21, points AB or AB' represent the left bracket 22, points CGD or CG'D' represent the right bracket 24, points BD or B'D' represent the lower bracket 23, and points EG or EG' represent the elastic unit 25.

Points ABDGEC represent the spread state of the pedal-connecting component 2. Specifically, a downward force exerted on the panel 1 enables the second elastic block 28 to abut against the position-limiting portion 238 to form friction therebetween for position limiting purpose. At this point, the spring 253 is in a compressed state, the elastic force is F, two component forces generated by the elastic force F are $F_1$ and $F_2$, and the force provided by the component force $F_1$ keeps the pedal-connecting component 2 in a spread state.

Points ABD'G'EC' represent the closed state of the pedal-connecting component 2. Specifically, an obliquely-upward force exerted on the panel 1 enables the first elastic block 27 to abut against the position-limiting plate 211 for purpose of position limiting. At this point, the spring 253 is in a compressed state, the elastic force is F', two component forces generated by the elastic force F' are $F_1'$ and $F_2'$, and the force provided by the component force $F_1'$ keeps the pedal connecting component 2 in a closed state.

It should be appreciated that, as shown in FIG. 10, when the three points CEG are on one line, the pedal-connecting component 2 is in an intermediate switching state. Specifically, the user pedals the bottom of the panel 1 in an inclined direction with his or her foot, and when the pedal-connecting component 2 passes the intermediate switching position and the component force $F_1'$ is larger than the weight of the pedal-connecting component 2, the pedal-connecting component 2 can be automatically retracted to the closed state under the action of the elastic force. The user pedals the panel 1 on the surface thereof, and when the pedal-connecting component 2 passes the intermediate switching position and the component force $F_1$ is larger than the weight of the pedal-connecting component 2, the pedal-connecting component 2 can be automatically spread under the action of the elastic force. Furthermore, because the spring 253 is compressed relative to the normal state when it is mounted, the spring 253 is in a compressed state no matter whether the pedal-connecting component 2 is in a spread state or in a closed state. Specifically, the spring 253 has a length of $L_1$ in the normal state before being mounted, has a length of $L_2$ when the pedal-connecting component 2 is in a closed state, has a length of $L_3$ when the pedal-connecting component 2 is in a spread state, and has a length of $L_4$ when the three points CEG are on a same line, where $L_1 > L_3 > L_2 > L_4$.

The vehicle and the semi-automatic foot-pedal device 100 thereof of the present disclosure connect the upper bracket 21 with the right bracket 24 by using the elastic unit 25 therebetween so that the semi-automatic foot-pedal device 100 thereof can be elastically spread or closed under an external force. Furthermore, the present disclosure has a simple structure and does not need a conventional motor system, so it saves the electric power and is safer to use.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the protection scope of the present disclosure.

What is claimed is:

1. A semi-automatic foot-pedal device, comprising a panel and a pedal-connecting component connected with the panel, the pedal-connecting component comprising:
    an upper bracket;
    a left bracket, being hinged to the upper bracket;
    a lower bracket, one end thereof being hinged to the left bracket and another end thereof being connected to the panel;
    a right bracket, one end thereof being hinged to the upper bracket, and another end thereof being hinged to the lower bracket; and
    an elastic unit, one end thereof being hinged to the upper bracket, and another end thereof being hinged to the right bracket;
    wherein when the pedal-connecting component is in a closed state, the panel moves away from the upper bracket to transform the pedal-connecting component into an elastically spread state under a force on the panel in a downward direction and the elastic unit generates pushing force toward its two opposite directions; and
    when the pedal-connecting component is in a spread state, the panel moves towards the upper bracket to transform the pedal-connecting component into an elastically closed state under a force on the panel in an obliquely-upward direction and the elastic unit generates pushing force toward its two opposite directions.

2. The semi-automatic foot-pedal device of claim 1, wherein the pedal-connecting component further comprises:
    a first hinge shaft, being adapted to hinge the left bracket to the upper bracket;
    a second hinge shaft, being adapted to hinge the lower bracket to the left bracket;
    a third hinge shaft, being adapted to hinge the right bracket to the upper bracket;
    a fourth hinge shaft, being adapted to hinge the right bracket to the lower bracket;
    a fifth hinge shaft, being adapted to hinge the elastic unit to the upper bracket; and
    a sixth hinge shaft, being adapted to hinge the elastic unit to the right bracket.

3. The semi-automatic foot-pedal device of claim 2, wherein the upper bracket comprises:
    a first plate block, being formed with a plurality of mounting screw holes;
    a second plate block and a third plate block, being disposed in parallel with and spaced apart from each other at two sides of the first plate block respectively; and
    a position-limiting plate, being connected with the first plate block.

4. The semi-automatic foot-pedal device of claim 3, wherein the left bracket comprises:
    a left connecting plate;
    a first left arm and a second left arm, being disposed in parallel with and spaced apart from each other at two sides of the left connecting plate respectively;

a reinforcing plate, being disposed between the first left arm and the second left arm; and a first position-limiting base, being disposed on the reinforcing plate.

5. The semi-automatic foot-pedal device of claim 4, wherein the pedal-connecting component further comprises a first elastic block, which is disposed inside the first position-limiting base and is adapted to abut against the position-limiting plate when the pedal-connecting component is closed.

6. The semi-automatic foot-pedal device of claim 5, wherein the right bracket comprises:

a right connecting plate;

a first right arm and a second right arm, being disposed in parallel with and spaced apart from each other at two sides of the right connecting plate respectively;

a bent piece, being connected between the first right arm and the second right arm; and a second position-limiting base, being disposed at a top of the bent piece.

7. The semi-automatic foot-pedal device of claim 6, wherein the elastic unit comprises:

a first hinge joint, being hinged between the first plate block and the third plate block;

a second hinge joint, being hinged to the bent piece; and a spring, being disposed between the first hinge joint and the second hinge joint.

8. The semi-automatic foot-pedal device of claim 7, wherein the lower bracket comprises a first arcuate plate, a second arcuate plate and a third arcuate plate, and the second arcuate plate and the third arcuate plate are disposed in parallel with and spaced apart from each other at two sides of the first arcuate plate respectively.

9. The semi-automatic foot-pedal device of claim 8, wherein the pedal-connecting component further comprises a second elastic block, which is disposed inside the second position-limiting base and is adapted to abut against the first arcuate plate when the panel is spread.

10. A vehicle, comprising a semi-automatic foot-pedal device, wherein the semi-automatic foot-pedal device comprises a panel and a pedal-connecting component connected with the panel, and the pedal-connecting component comprises:

an upper bracket;

a left bracket, being hinged to the upper bracket;

a lower bracket, one end thereof being hinged to the left bracket and another end thereof being connected to the panel;

a right bracket, one end thereof being hinged to the upper bracket, and another end thereof being hinged to the lower bracket; and an elastic unit, one end thereof being hinged to the upper bracket, and another end thereof being hinged to the right bracket;

wherein when the pedal-connecting component is in a closed state, the panel moves away from the upper bracket to transform the pedal-connecting component into an elastically spread state under a force on the panel in a downward direction and the elastic unit generates pushing force toward its two opposite directions; and when the pedal-connecting component is in a spread state, the panel moves towards the upper bracket to transform the pedal-connecting component into an elastically closed state under a force on the panel in an obliquely-upward direction and the elastic unit generates pushing force toward its two opposite directions.

11. The vehicle of claim 10, wherein the pedal-connecting component further comprises:

a first hinge shaft, being adapted to hinge the left bracket to the upper bracket;

a second hinge shaft, being adapted to hinge the lower bracket to the left bracket;

a third hinge shaft, being adapted to hinge the right bracket to the upper bracket;

a fourth hinge shaft, being adapted to hinge the right bracket to the lower bracket;

a fifth hinge shaft, being adapted to hinge the elastic unit to the upper bracket; and a sixth hinge shaft, being adapted to hinge the elastic unit to the right bracket.

12. The vehicle of claim 11, wherein the upper bracket comprises:

a first plate block, being formed with a plurality of mounting screw holes;

a second plate block and a third plate block, being disposed in parallel with and spaced apart from each other at two sides of the first plate block respectively; and a position-limiting plate, being connected with the first plate block.

13. The vehicle of claim 12, wherein the left bracket comprises:

a left connecting plate;

a first left arm and a second left arm, being disposed in parallel with and spaced apart from each other at two sides of the left connecting plate respectively;

a reinforcing plate, being disposed between the first left arm and the second left arm; and a first position-limiting base, being disposed on the reinforcing plate.

14. The vehicle of claim 13, wherein the pedal-connecting component further comprises a first elastic block, which is disposed inside the first position-limiting base and is adapted to abut against the position-limiting plate when the pedal-connecting component is closed.

15. The vehicle of claim 14, wherein the right bracket comprises:

a right connecting plate;

a first right arm and a second right arm, being disposed in parallel with and spaced apart from each other at two sides of the right connecting plate respectively;

a bent piece, being connected between the first right arm and the second right arm; and a second position-limiting base, being disposed at a top of the bent piece.

16. The vehicle of claim 15, wherein the elastic unit comprises:

a first hinge joint, being hinged between the first plate block and the third plate block;

a second hinge joint, being hinged to the bent piece; and a spring, being disposed between the first hinge joint and the second hinge joint.

17. The vehicle of claim 16, wherein the lower bracket comprises a first arcuate plate, a second arcuate plate and a third arcuate plate, and the second arcuate plate and the third arcuate plate are disposed in parallel with and spaced apart from each other at two sides of the first arcuate plate respectively.

18. The vehicle of claim 17, wherein the pedal-connecting component further comprises a second elastic block, which is disposed inside the second position-limiting base and is adapted to abut against the first arcuate plate when the panel is spread.

19. A vehicle, comprising a semi-automatic foot-pedal device, wherein the semi-automatic foot-pedal device comprises a panel and a pedal-connecting component connected with the panel, and the pedal-connecting component comprises:
   an upper bracket;
   a left bracket, being hinged to the upper bracket;
   a lower bracket, one end thereof being hinged to the left bracket and another end thereof being connected to the panel;
   a right bracket, one end thereof being hinged to the upper bracket, and another end thereof being hinged to the lower bracket; and
   an elastic unit, one end thereof being hinged to the upper bracket, and another end thereof being hinged to the right bracket, wherein the elastic unit is located between the left and right brackets, and the left and right brackets surround the elastic unit therebetween.

20. The vehicle of claim 19, wherein the elastic unit comprises a compression spring providing pushing force toward its two opposite sides.

\* \* \* \* \*